United States Patent
Hüthwohl

(10) Patent No.: US 9,057,304 B2
(45) Date of Patent: Jun. 16, 2015

(54) METERING SYSTEM FOR INJECTING A UREA SOLUTION INTO THE EXHAUST GAS FLOW OF AN INTERNAL COMBUSTION ENGINE

(75) Inventor: Georg Hüthwohl, Soest (DE)

(73) Assignee: ALBONAIR GMBH, Dortmund (DE)

( * ) Notice: Subject to any disclaimer, the term of this patent is extended or adjusted under 35 U.S.C. 154(b) by 0 days.

(21) Appl. No.: 12/810,335

(22) PCT Filed: Feb. 2, 2009

(86) PCT No.: PCT/EP2009/000664
§ 371 (c)(1),
(2), (4) Date: Jun. 24, 2010

(87) PCT Pub. No.: WO2009/112129
PCT Pub. Date: Sep. 17, 2009

(65) Prior Publication Data
US 2010/0319322 A1  Dec. 23, 2010

(30) Foreign Application Priority Data
Mar. 12, 2008  (DE) .......................... 10 2008 013 960

(51) Int. Cl.
*F01N 3/30* (2006.01)
*F01N 3/20* (2006.01)

(52) U.S. Cl.
CPC ....... *F01N 3/2066* (2013.01); *F01N 2900/1824* (2013.01); *F01N 3/208* (2013.01);
(Continued)

(58) Field of Classification Search
CPC .................. F01N 2610/085; F01N 2610/146; F01N 2900/1824; F01N 2560/06; F01N 2560/07; F01N 2610/02; F01N 2610/148; F01N 3/208
USPC .............................. 60/274, 286, 295, 301, 303
See application file for complete search history.

(56) References Cited

U.S. PATENT DOCUMENTS 5,605,042 A * 2/1997 Stutzenberger ................ 60/286
6,041,594 A * 3/2000 Brenner et al. ................. 60/309
(Continued)

FOREIGN PATENT DOCUMENTS

DE     1 435 458       3/1969
DE     42 21 363 A1    1/1993
(Continued)

OTHER PUBLICATIONS
Novelty Search Report from German Application No. 10 2008 013 960.2.

*Primary Examiner* — Thomas Denion
*Assistant Examiner* — Jorge Leon, Jr.
(74) *Attorney, Agent, or Firm* — Law Offices of Robert F. Zielinski, LLC

(57) ABSTRACT

The invention relates to a metering system for injecting a urea solution into the exhaust gas flow (9) of an internal combustion engine for selective catalytic reduction, and method for controlling the injecting of a urea solution by means of compressed air, wherein the metering system can be connected to a urea solution tank (1), wherefrom urea solution can be removed, and wherein the metering system can be connected to a compressed air supply (6), wherein the metering system comprises at least one nozzle (5) through which the urea solution can be injected into the exhaust gas flow (9) by means of compressed air, wherein the metering system comprises an air valve (7) by means of which the pressure and/or the quantity of air and/or the valve opening times of the compressed air supply (6) can be regulated, and a sensor for measuring the pressure and/or the quantity of air is disposed in the compressed air supply (6) between the air valve (7) and the nozzle (5), so that the quantity of compressed air fed in for atomizing the urea solution is controlled and lowered to the minimum air quantity required at a given moment, depending on the operating parameters of exhaust gas temperature and exhaust gas mass flow.

7 Claims, 2 Drawing Sheets

(52) U.S. Cl.
CPC ..... *F01N2610/146* (2013.01); *F01N 2610/148* (2013.01); *F01N 2610/085* (2013.01); *F01N 2560/06* (2013.01); *F01N 2610/02* (2013.01); *F01N 2610/08* (2013.01); *F01N 2610/14* (2013.01); *F01N 2610/1453* (2013.01); *F01N 2610/1473* (2013.01); *Y02T 10/24* (2013.01)

(56) References Cited

U.S. PATENT DOCUMENTS

| | | | |
|---|---|---|---|
| 6,192,677 B1* | 2/2001 | Tost | 60/286 |
| 6,273,120 B1 | 8/2001 | Hofmann et al. | |
| 6,575,382 B1* | 6/2003 | Fischer et al. | 239/5 |
| 2004/0035952 A1* | 2/2004 | Gerstner | 239/433 |
| 2004/0060286 A1* | 4/2004 | Huber et al. | 60/286 |
| 2005/0284136 A1* | 12/2005 | Plougmann | 60/286 |
| 2006/0196170 A1* | 9/2006 | Henning et al. | 60/286 |
| 2007/0209349 A1* | 9/2007 | Ripper et al. | 60/286 |
| 2008/0022663 A1* | 1/2008 | Dodge et al. | 60/286 |
| 2008/0264041 A1* | 10/2008 | Gerlach | 60/286 |
| 2008/0282681 A1* | 11/2008 | Katou et al. | 60/286 |
| 2009/0255232 A1* | 10/2009 | Barcin | 60/274 |
| 2010/0122521 A1* | 5/2010 | Sun et al. | 60/284 |

FOREIGN PATENT DOCUMENTS

| | | |
|---|---|---|
| DE | 199 47 198 A1 | 5/2001 |
| DE | 100 47 512 A1 | 8/2002 |
| DE | 103 59 522 A1 | 7/2005 |
| EP | 0 849 443 A1 | 10/1997 |
| JP | 2007100672 | 4/2007 |
| WO | 0224312 | 3/2002 |

* cited by examiner

METERING SYSTEM FOR INJECTING A UREA SOLUTION INTO THE EXHAUST GAS FLOW OF AN INTERNAL COMBUSTION ENGINE

The present application is a U.S. national stage application under 35 U.S.C. §371 of PCT Application No. PCT/EP2009/000664, filed Feb. 2, 2009, which in turn claims the priority benefit of German Patent Application No. 102008013960.2, filed Mar. 12, 2008, the entireties of which are incorporated herein by reference.

The invention relates to a metering system for spraying a urea solution into the exhaust gas stream of an internal combustion engine for selective catalytic reduction, whereby the metering system can be connected to a urea solution tank from which the urea solution can be removed, and whereby the metering system can be connected to a compressed air supply, whereby the metering system has at least one nozzle, through which the urea solution can be sprayed into the exhaust gas stream by means of compressed air. In addition, the invention relates to a method for controlling the spraying of a urea solution by means of compressed air into the exhaust gas stream of an internal combustion engine for selective catalytic reduction.

SCR catalysts are used to prevent nitrogen oxide emissions from diesel engines. In this respect, a reducing agent is sprayed into the exhaust gas system with a metering device. Ammonia is used as a reducing agent.

Since the entrainment of ammonia in motor vehicles is relevant to safety, urea is used in aqueous solution usually with a proportion of 32.5% urea. In exhaust gas, the urea decomposes at temperatures of above 150° Celsius into gaseous ammonia and $CO_2$. Parameters for the decomposition of urea are essentially time (evaporation and reaction time), temperature, and droplet size of the sprayed urea solution. In these SCR catalysts, the emission of nitrogen oxides is reduced by approximately 90% by selective catalytic reduction (SCR).

Various systems for spraying urea are known. The spraying of urea can be supported by compressed air. The compressed air is used as an energy distributor. This is advantageous for achieving small droplets.

At high temperatures of above approximately 200° Celsius, the urea can decompose and form deposits that are difficult to remove. These deposits can clog the nozzles. The compressed air can therefore be used in addition to cool around the urea nozzle at high exhaust gas temperatures. The urea solution is metered by means of a metering system, injected into the exhaust gas stream, and it ensures the desired chemical reaction in the SCR catalyst. In this occurrence, nitrogen oxides are converted into nitrogen and water vapor.

In the systems that are now used in motor vehicles, compressed air and urea are combined in a mixing chamber and sprayed into the exhaust gas via a simple perforated die. In this way, the air-mass stream is adjusted to a constant value to keep the urea from streaming back into the air stream in front of the mixing chamber. In this respect, a defined boundary between urea-carrying areas and urea-free areas is shown, and a crystallization of the urea in the mixing system is avoided. Areas in the metering system in which urea only enters at times have to be avoided, since there is a risk here that the aqueous urea solution dries, which forms urea crystals, and the air channels or the urea channels become clogged.

The clogging tendency following a crystallization by ureas is disadvantageous in the known systems. By means of liquid urea, such crystals can be dissolved again. However, clogging of the systems cannot be avoided at least at times.

Commercial vehicles in general have a compressed air system for the braking system as well as several additional users. The air pressure of the systems in most cases is above 10 bar. In the known systems, the compressed air of these compressed air systems of the commercial vehicles is also used for the atomization or spraying of urea by means of the known metering systems.

It is disadvantageous in this case, however, that a higher consumption of fuel by the engine is the result because of the continuous air consumption of the metering system. It is also disadvantageous that the supply of air has to be matched to the additional consumers in the form of the urea metering system. It is especially disadvantageous in this case that multiple compressors with increased output are necessary.

The object of the invention is to make available a metering system with support of the atomization by compressed air, in which the consumption of compressed air is minimized.

This object is achieved according to the invention by a metering system according to claim 1 as well as by a method for controlling the spraying of a urea solution according to claim 14. Advantageous configurations of the invention are indicated in the respective dependent claims.

It is especially advantageous in the metering system for spraying a urea solution into the exhaust gas stream of an internal combustion engine for selective catalytic reduction—whereby the metering system can be connected to a urea solution tank from which the urea solution can be removed and whereby the metering system can be connected to a compressed air supply, whereby the metering system has at least one nozzle through which the urea solution can be sprayed into the exhaust gas stream by means of compressed air—that the metering system has an air-control valve—by means of which the pressure, and/or the amount of air, and/or the valve opening times of the compressed air supply can be adjusted—and that a sensor for measuring the pressure and/or the amount of air in the compressed air supply is arranged between the air-control valve and the nozzle.

Thus, in the metering system according to the invention for injecting or spraying a urea solution into the exhaust gas stream, the air pressure of the compressed air supply is monitored and adjusted corresponding to the requirements.

It is especially advantageous in the method according to the invention for controlling the spraying of a urea solution by means of compressed air into the exhaust gas stream of an internal combustion engine for selective catalytic reduction that the amount of compressed air fed to the urea solution for atomization is controlled at each operating point based on the operating parameters of exhaust gas temperature and exhaust gas mass stream and is reduced to the minimum amount of air that is required in each case so that the droplet quality of the sprayed urea solution is sufficient for the action of the catalyst.

In the metering system according to the invention and the method for controlling the spraying of the urea solution according to the invention, the compressed air is thus fed in a regulated manner via a corresponding control valve. The amount of air that is fed is readjusted at each operating point to the extent that the droplet quality is just barely sufficient for the action of the catalyst. This takes place by the matching of the amount of metering air at each operating point of the engine based on the operating parameters. As operating parameters, in this case, in particular the exhaust gas temperature and/or the exhaust gas mass stream are acquired and fed to the regulation of the amount of air, i.e., the amount of air is readjusted in each case based on the current engine operating points.

A reduction of the amount of air in the nozzle means a worsening of the droplet quality, i.e., a larger droplet diameter. The minimum required droplet quality is based on the degree of efficiency of the catalyst that is required at the respective operating point. The amount of air pressure is lowered to the respective requirement corresponding to the required minimum. For this purpose, the consumption of compressed air in motor vehicles is lowered more significantly.

In an especially preferred embodiment of the metering system, the air-control valve is a proportional control valve. By the use of a proportional control valve, it is possible to regulate exactly the amount of air of the compressed air supply, i.e., the amount of air that is fed into the exhaust gas stream for spraying the urea solution.

Preferably, the sensor, which is arranged between the air-control valve and the nozzle, is a pressure sensor, by means of which the pressure in the compressed air system is monitored behind the air-control valve.

In an especially preferred embodiment, the metering system receives a signal of the exhaust gas mass stream from the engine control system. The exhaust gas mass stream is calculated by the engine control device from the suctioned air mass stream and fuel mass stream and is provided as a signal of the exhaust gas mass stream. As an alternative, the metering system has a sensor for measuring the exhaust gas mass stream. Preferably, as an alternative or additionally, the metering system has a sensor for measuring the exhaust gas temperature.

From the exhaust gas mass stream signal and/or the exhaust gas temperature, it is possible to detect the operating parameters of exhaust gas temperature and/or exhaust gas mass stream that are present based on the respective engine operating point and to make an evaluation on a corresponding control electronics of the metering system, and to adjust the pressure and/or the amount of air and/or the valve opening times of the compressed air supply based on the operating parameters that are measured.

The influencing factors for the matching of the metering of the amount of air are in particular:

Exhaust gas temperature
Exhaust gas mass stream
Urea mass stream
Required degree of efficiency of the catalyst
Catalyst size
Preparation section between urea metering and catalyst It is thus possible with the metering system according to the invention to optimize the amount of air at each individual operating point based on the respective boundary conditions.

In an especially preferred embodiment, the compressed air supply has a butterfly valve. By the arrangement of a butterfly valve, it is possible to lower the air pressure correspondingly in the air pressure system before the supply to the nozzle.

In an especially preferred embodiment, the metering system has a metering pump for carrying the urea solution. In particular, such a metering pump can be a metering pump that can be controlled relative to the required mass stream of the urea solution in such a way that the feed rate of the urea solution can be matched at the respective operating point by a corresponding activation of the metering pump.

A connecting line is preferably arranged between the urea output and a line of the compressed air supply, whereby the connecting line has a nonreturn valve.

To interrupt the air supply completely in metering pauses, it is necessary to remove the urea from the hot areas in order to prevent deposits from forming. Otherwise, the urea would decompose at high temperatures and would result in deposits and thus in clogs. By the arrangement of a compressed-air line, i.e., a connecting line between a urea line and a line of the compressed air supply, such deposits can be prevented by the build-up of urea being blown free by means of compressed air during metering pauses. A nonreturn valve, whose opening pressure is above the air pressure that is set in the metering after the air valve, is inserted into this connecting line.

In the metering operation, this nonreturn valve is closed, since the pressure in the compressed-air line lies below the opening pressure of the nonreturn valve. In order to blow the urea line free with compressed air, the urea supply is turned off by the metering pump, and the air valve is opened for a short time, enough to allow the pressure to rise above the opening pressure of the nonreturn valve. Because of the regulator in the compressed-air line, a pressure drop is produced in the metering line, and the compressed air drives the urea into the exhaust gas system. The line is thus blown free. After a short air burst, the urea is blown out of the metering nozzle, and the air supply can be completely turned off.

Preferably, the metering system has a compressed air compressor. By means of such a compressed air compressor, it is possible to prepare the compressed air that is required for the metering system unless no compressed air supply or an insufficient compressed air supply is present in the installation environment of the metering system.

The metering system preferably has a control device by means of which the air valve and/or a butterfly valve and/or a metering pump and/or a compressed air compressor can be controlled based on the measured values that are acquired by the sensor or the sensors.

By the arrangement of such a control device, which controls one or more components of the metering system based on the sensor measured values, i.e., based on the current operating parameters, an optimization of the operation of the metering system, i.e., an air optimization, can be achieved in an especially advantageous way. By means of such a control device, it is thus possible to match—and thus to regulate—the urea feed rate and the air feed rate in an optimal way to the current operating parameters of the internal combustion engine and the catalyst for selective, catalytic reduction.

Preferably, the metering system has a urea solution tank. Because the metering system itself has a urea solution tank, it is possible to retrofit the metering system in corresponding environments in which a urea solution tank is not already present.

In a preferred embodiment, the metering system has a binary nozzle. Especially preferably, the binary nozzle is an outward-mixing nozzle.

The method according to the invention for controlling the spraying or injection of a urea solution by means of compressed air into the exhaust gas stream of an internal combustion engine for selective catalytic reduction is preferably configured in such a way that when the spraying of urea solution is interrupted or completed, the urea solution is cleaned from the urea solution-carrying lines by means of compressed air.

The method is thus preferably configured in such a way that a completion or interruption of the supply of urea solution is carried out over time before the compressed air supply is completed or interrupted, and the compressed air is used after the supply of the urea solution is interrupted or completed in order to clean the urea solution-carrying parts by means of compressed air. In this respect, the urea in particular is removed from the hot areas of the metering system. Otherwise, the urea would decompose at high temperatures and would form deposits and could lead to clogs.

To blow the urea line free with compressed air, the urea supply is turned off by the metering pump, and the air-control valve is opened for a short time, enough to allow the pressure to rise above the opening pressure of a nonreturn valve in a connecting line between a urea line and a compressed-air line. Because of this, a pressure drop is produced in the metering line, so that the compressed air drives the urea into the exhaust gas system and thus the urea-carrying line is blown free. After a brief air burst, the urea is blown out from the metering nozzle, and the air supply can also be turned off completely.

The spraying of the urea solution can thus be interrupted or completed by a metering pump being turned off.

Before the metering is restarted, it is useful first to set the compressed air to a value that is above the normal metering air supply in order to cool off the nozzle before the urea enters into the latter.

Blowing out the urea from the lines is also advantageous when the entire system is turned off. Urea freezes at temperatures of below −11° Celsius. In this way, the urea water solution expands by about 10%. This leads to frost pressure, by which components could be destroyed. It is therefore necessary to blow the urea out of the nozzle before the system is turned off completely.

This can take place in particular in that after the urea supply is completed, the entire system is cleaned by means of compressed air, i.e., the urea is blown out from the system by means of compressed air.

Preferably, an activation of at least one metering pump and/or at least one compressed air compressor and/or at least one air-control valve is carried out based on the operating parameters of exhaust gas temperature and exhaust gas mass stream in the method according to the invention for controlling the spraying or injection of the urea solution. To this end, by means of a corresponding control device, the various acquired operating parameters can be evaluated, so that an activation of the components can be carried out exactly.

In the figures, two embodiments of a metering system according to the invention for spraying a urea solution into the exhaust gas stream of an internal combustion engine are shown and are explained below. Here:

In the figures, identical components and assemblies are referred to with identical reference numbers. FIG. 1 shows the diagrammatic visualization of a first embodiment of the urea metering system.

Figure 1:
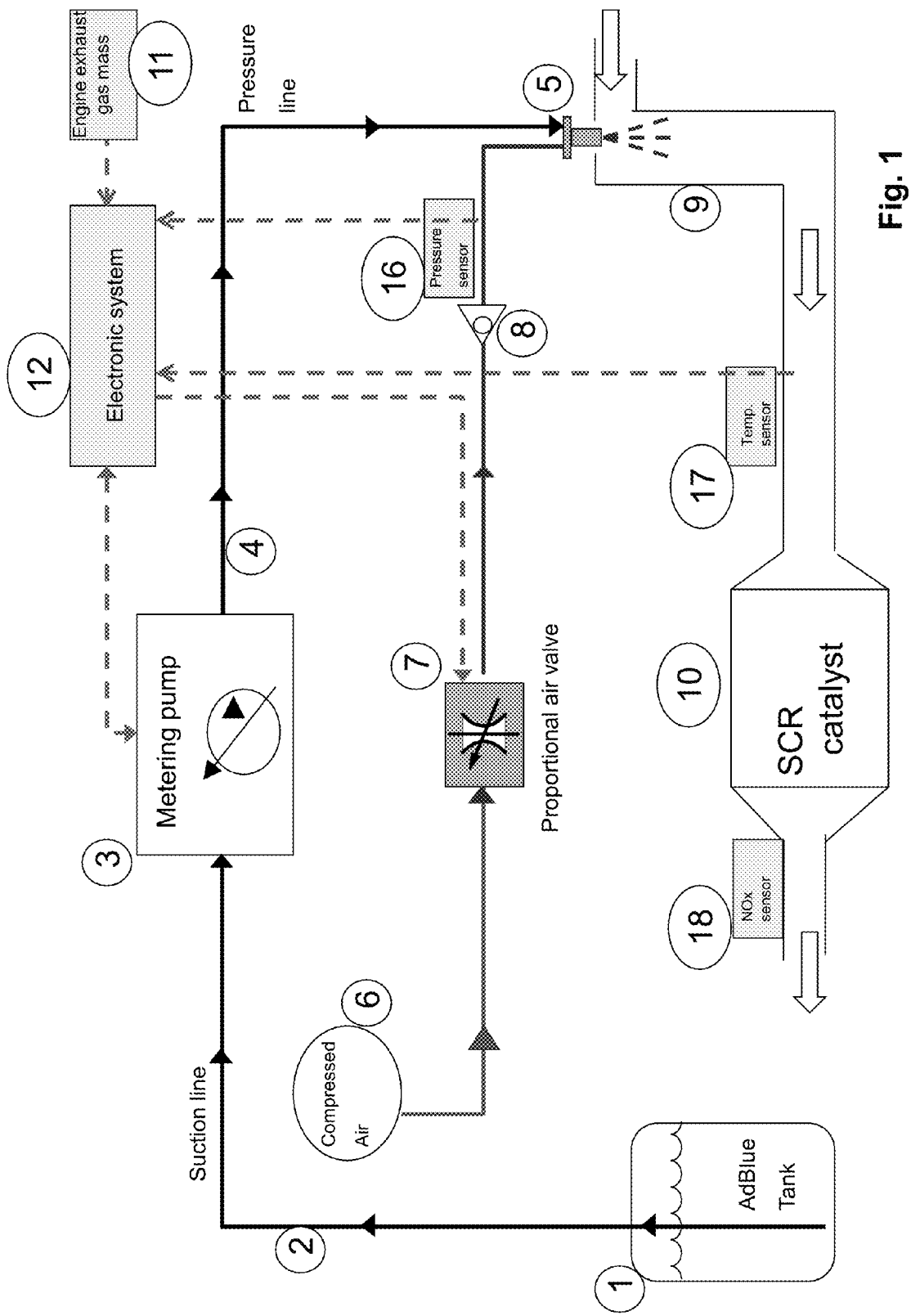
FIG. 1 shows an installation diagram of a first embodiment of a metering system.

Urea is suctioned off from a tank 1 via a suction line 2 by the metering pump 3. The metering pump 3 is, for example, a membrane pump or a reciprocating pump, which carries a defined amount of urea solution with each stroke and thus meters equally. The urea is sent to a binary nozzle 5 via a pressure line 4. The binary nozzle 5 is preferably an outward-mixing nozzle, in which an air jet atomizes the urea.

Compressed air is sent from a compressed air container 6 to a proportional air valve 7. The proportional air valve 7 cuts off the pressure flow at a value that is specified by the electronic system 12. Input values for the calculation of this value by means of the electronic control unit 12 are engine data, such as the exhaust gas mass streams that are delivered by the engine electronic system, and, in addition, the exhaust gas temperature, as well as the pressure of the compressed air before that of the binary nozzle 5. The pressure before the binary nozzle 5 is a measurement of the accepted air volume flow. The air is sent via a compressed-air line and a nonreturn valve 8 to the binary nozzle 5. The urea is atomized in the binary nozzle 5 from the compressed air and fed to the exhaust gas stream 9.

To acquire the operating parameters of exhaust gas mass stream, air pressure and exhaust gas temperature, the following are arranged: a sensor 11 for detecting the exhaust gas mass stream, a pressure sensor 16 for detecting the pressure of the compressed air before the binary nozzle 5, as well as a temperature sensor 17 for detecting the exhaust gas temperature in the exhaust gas stream 9. In one alternative, not shown, an exhaust gas mass stream signal from the engine management system is provided.

The measured values of the sensors 11, 16, 17 are fed to the control unit 12. In the control unit 12, the acquired sensor data and engine data are evaluated, and an activation of the proportional air valve 7 and the metering pump 3 is carried out based on the temporary operating data. The nozzle tip of the binary nozzle 5 is arranged in the exhaust gas stream 9. The urea is sent via the exhaust gas line to the SCR catalyst 10. In this way, a larger part of the liquid droplets evaporates. The urea converts into ammonia. In the catalyst 10 itself, the nitrogen oxide emission from the engine is reduced with ammonia.

The nonreturn valve 8 in the pressure line between the proportional air valve 7 and the binary nozzle 5 prevents urea from being able to be pressed into the compressed-air lines if the nozzle 5 becomes clogged.

Figure 2:
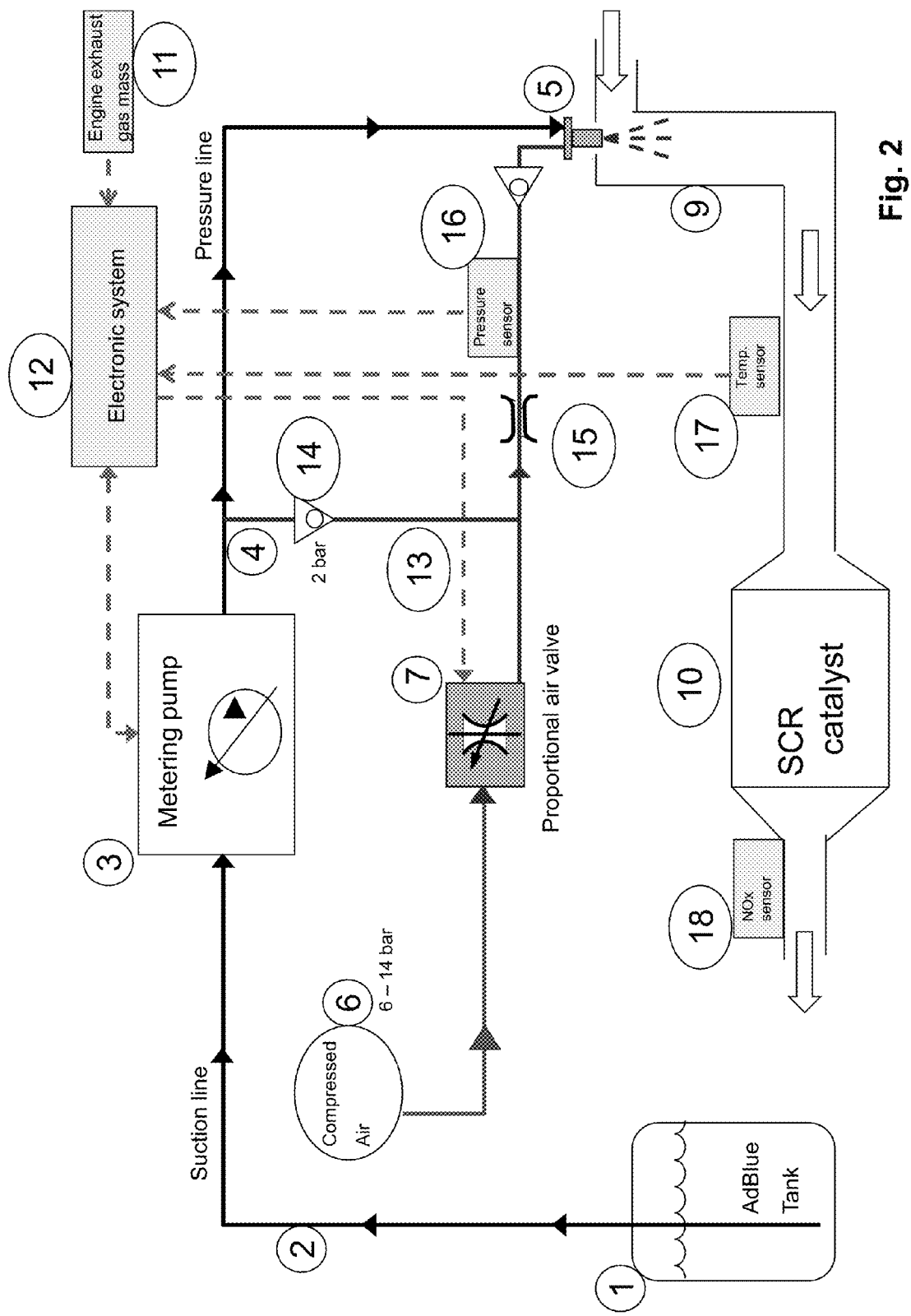
FIG. 2 shows an installation diagram of a second embodiment of a metering system.

FIG. 2 shows a second embodiment of a metering system according to the invention in which it is possible—without additional actively actuated components—to drive the urea with the compressed air from the pressure line and the nozzle in order to remove the urea from the hot areas in the metering pauses in order to prevent the urea from decomposing at high temperatures and forming deposits.

In this way, the compressed-air line after the proportional air valve 7 with the urea line 4 is connected via a spring-loaded nonreturn valve 14 with the line 13. In addition, a flow regulator 15 is incorporated into the compressed-air line after the proportional compressed air valve 7 and after the branching of the line 13.

In the simplest case, the line itself can take over the function of the flow regulator 15 when said line is long enough. During the metering operation, the pressure in the line of the regulator 15 is below the opening pressure of the spring-loaded nonreturn valve 14. The compressed air flows through the nozzle 5. In this way, the added urea is atomized. If, in the deactivated metering pump 3, the pressure after the proportional pressure valve 7 is raised to a value above the opening pressure of the nonreturn valve 14, air flows into the pressure line 4 of the urea. The urea is expelled in line 4 and nozzle 5. Thus, after the engine is turned off, the area of the nozzle 5 is urea-free and thus frost-resistant. During the operation of the engine, no deposits can form at high exhaust gas temperatures without metering.

The invention claimed is:

1. A metering system for spraying a urea solution into an exhaust gas stream (9) of an internal combustion engine for selective catalytic reduction comprising:
   a urea solution tank (1) for delivering a urea solution;
   a metering pump (3), which suctions off urea solution from the urea solution tank (1);
   at least one nozzle (5) through which said urea solution is sprayed into said exhaust gas stream;
   a compressed air supply (6);
   an air valve (7) operatively connected to said at least one nozzle; and at least one pressure sensor (16) positioned between said air valve (7) and said at least one nozzle (5) for measuring pressure or an amount of air present in the compressed air supply, wherein said at least one pressure sensor (16) is in operative communication with said air valve (7), wherein said air valve (7) regulates the pressure or the amount of air and valve opening times of the compressed air supply (6) for atomizing the urea solution when injecting said urea solution into the exhaust gas stream, and further wherein said at least one nozzle (5) is an outward-mixing binary nozzle;

at least one temperature sensor (17) for detecting exhaust gas temperature in the exhaust gas stream (9);

a control device (12), for controlling at least the air valve (7) and the metering pump (3) based on measured values acquired by the at least one pressure sensor (16) and the at least one temperature sensor (17), wherein mixing of the urea solution and air takes place outwardly or downstream of a discharge outlet of the at least one nozzle (5), wherein compressed air fed to the urea solution is adjusted so that droplet quality of sprayed urea solution is sufficient for catalytic reduction, and wherein the compressed air fed to the urea solution for atomization is controlled at each operating point based on the exhaust gas temperature and exhaust gas mass stream.

2. A metering system according to claim 1, wherein the air valve (7) is a proportional control valve.

3. A metering system according to claim 1, wherein the metering system has means for calculating the exhaust gas mass stream or a sensor (11) for measuring the exhaust gas mass stream.

4. A metering system according to claim 1, wherein the compressed air supply (6) has a butterfly valve (15).

5. A metering system according to claim 1, wherein the metering pump (3) supplies the urea solution.

6. A metering system according to claim 1, wherein a connecting line (13) is arranged between a urea line (4) and a line of the compressed air supply, whereby the connecting line (13) has a nonreturn valve (14).

7. A metering system according to claim 1, wherein the metering system has a compressed air compressor.

* * * * *